United States Patent Office 3,303,141
Patented Feb. 7, 1967

3,303,141
PROCESSING OF ELECTROLUMINESCENT
PHOSPHORS
Philip M. Jaffe, Nutley, N.J., assignor to Westinghouse Electric Corporation, Pittsburgh, Pa., a corporation of Pennsylvania
No Drawing. Filed Oct. 3, 1963, Ser. No. 313,419
8 Claims. (Cl. 252—301.6)

This invention relates to a method for improving electroluminescent phosphor and, more particularly, to a method for improving the maintenance of light emission and performance of electroluminescent phosphor.

It is disclosed in U.S. Patent No. 3,082,344, dated March 19, 1963, to fire or bake electroluminescent phosphor in an atmosphere comprising oxygen at a temperature of from 470° C. to 1000° C. for a period of at least about one hour, in order to improve the so-called maintenance of light emission which is obtainable from the electroluminescent device which incorporates such processed phosphor. It is disclosed in U.S. Patent No. 3,080,325, dated March 5, 1963, to bake or fire cyanide-washed electroluminescent phosphor at a temperature of from 300° C. to 700° C. in either a neutral or oxidizing atmosphere, in order to improve the maintenance of light emission which is obtainable from a device which incorporates such processed phosphor. When the phosphor is baked in an oxidizing atmosphere, some of the zinc sulfide matrix is converted to zinc oxide and if the amount of formed zinc oxide is excessive, this should be removed before the phosphor can be utilized. If neutral atmospheres such as nitrogen are used to bake the processed phosphor, the phosphor performance is generally inferior.

It is the general object of the present invention to provide a method for processing electroluminescent phosphor which will avoid oxidation of the phosphor matrix constituents while still improving the performance obtainable from an electroluminescent device which incorporates such processed phosphor.

It is another object to provide a method for processing electroluminescent phosphor in order to improve the maintenance of light emission which is obtainable from the phosphor.

The aforesaid objects of the invention, and other objects which will become apparent as the description proceeds, are achieved by baking an electroluminescent phosphor, which has a matrix at least principally comprising zinc sulfide and which includes copper as activator, in a mildly reducing atmosphere at a temperature of from 450° C. to 700° C. for a period of at least about one hour. Preferably the phosphor is initially washed in a sodium cyanide solution and thereafter has copper compound added thereto. The washed phosphor and added copper compound are then baked in the mildly reducing atmosphere as indicated hereinbefore.

Electroluminescent phosphors processed in accordance with the present invention have a matrix which at least principally comprises zinc sulfide. Such phosphors are generally described in the aforementioned Patent No. 3,082,344. As indicated in this patent, the zinc sulfide matrix can be modified by the addition of cadmium sulfide or by zinc or cadmium selenides, in order to modify the phosphor emission characteristics. The primary activator which is utilized is copper, although the copper activator can be supplemented by other activators such as manganese and the phosphor can be coactivated either by halogen or by trivalent metals, such as aluminum. The selection of the coactivator can modify the emission characteristics of the phosphor and also its other performance characteristics.

As a specific example for practicing the present method, 100 grams of zinc sulfide are mixed with 30 grams of sulfur, 12.8 grams of copper acetate and 4.5 grams of ammonium chloride. This mixture is fired in a partially closed container in a nitrogen atmosphere at a temperature of 950° C. for about 100 minutes. The sulfur which is added to the raw mix provides a sulfurizing atmosphere during the firing. Thereafter, the phosphor is lightly crushed, 30 grams of sulfur are added to the phosphor in order to provide a sulfurizing atmosphere, and it is refired in a similar manner. After final firing the phosphor is again crushed to finely divided status. Other sulfurizing atmospheres such as a mixture of nitrogen, hydrogen sulfide and hydrogen chloride can be substituted for the preferred firing atmosphere as given hereinbefore. As is well known, in order to produce zinc sulfide-type electroluminescent phosphors having optimum performance characteristics, it is necessary to incorporate copper in the raw mix in excess of that amount of copper which is ultimately desired to be retained. The foregoing phosphor, after firing, will have a dark body color, and while it will be electroluminescent, it is customary and desirable to wash the phosphor in a material or solution which is a good solvent for cuprous sulfide, but which is not a good solvent for zinc sulfide. The usual solvent solution which is used to dissolve excess cuprous sulfide is an alkali cyanide aqueous solution, such as 10% by weight sodium cyanide, made strongly alkaline with 5% by weight of sodium hydroxide in order to inhibit any tendency to form hydrogen cyanide. As a specific example, the phosphor is boiled for a period of ten minutes in the foregoing sodium cyanide solution, and thereafter it is water washed and then dried by rinsing with ethanol. Other cuprous-sulfide solvents can be used, such as aqueous solutions of potassium or ammonium cyanide; sodium, potassium or ammonium thiosulphate; or sodium, potassium or ammonium thiocyanate, for example, or mixtures of the foregoing. The concentration of these washing solutions and the washing conditions have not been found to be critical.

In the preferred mode for practicing the present invention, the washed phosphor then has added thereto from 0.001% to 1% by weight of copper, in compound form. This added copper compound is evenly distributed throughout the phosphor. As a specific example, an aqueous solution of 0.01% by weight of copper, in the form of the acetate, is added to the phosphor so that the particles of the phosphor are wetted by this additive solution. The water is then evaporated leaving the copper compound evenly distributed throughout the phosphor. The dried phosphor is then baked in a mildly reducing atmosphere, in accordance with the present invention, at a temperature of from 450° to 700° C. for a period of at least about one hour. The period for such baking can be extended to many hours, if desired. Thereafter the phosphor is incorporated into an electroluminescent device in accordance with conventional processing. Mildly reducing atmospheres in which the phosphor can be baked in accordance with the present invention include ammonia, sulfur dioxide and carbon monoxide.

A convenient standard for testing the performance of an electroluminescent device is to measure the initial brightness of the device, and then operate the device until its brightness has decreased to one half of the original value. The product of initial brightness times the time in hours required to decrease the initial brightness to one half of its original value is a good measure of the overall performance of the electroluminescent device. In the following Table I are indicated various baking atmospheres and the product of initial brightness times the operating period required to decrease the brightness to one half of its original value. The best results, as far as overall performance is concerned, were obtained with an ammonia baking atmosphere, although sulfur dioxide and carbon monoxide gave relatively good results. Also shown in the following Table I is the effect of a nitrogen bake and also the performance of the unprocessed control. While the initial brightness of the control sample was somewhat greater than the other phosphor lots, the maintenance was very poor.

*Table I*

| Baking atmosphere (one-hour bake): | Product of initial brightness times operating period (in hours) required to decrease brightness to one-half its original value (operation at 400 cycles) |
|---|---|
| $NH_3$ | 9200 |
| $SO_2$ | 7100 |
| CO | 5400 |
| $N_2$ | 2200 |
| Control (no bake) | 450 |

The foregoing phosphor processing is subject to modification. For example, the phosphor as initially prepared can be baked in the mildly reducing atmosphere, in accordance with the present invention. The phosphor is cooled and then washed in the sodium cyanide solution. In such case, it is not necessary to add copper to the phosphor before it is baked in the mildly reducing atmosphere. Desirably such phosphor is ultimately washed in the sodium cyanide solution, however, before it is incorporated into the electroluminescent device, and such washing can conveniently be done after the baking.

As far as present experiments are concerned, the present invention is applicable to electroluminescent phosphor having a matrix which at least principally comprises zinc sulfide and which includes copper as activator, and which phosphor has initially been prepared by firing the phosphor raw mix constituents in the sulfurizing atmosphere. Preferably, the phosphor is initially fired in such sulfurizing atmosphere at a temperature of from 800° C. to 1100° C. for at least ten minutes, with the lower the firing temperature the longer the firing time, but such initial processing is subject to some variation.

It will be recognized that the objects of the invention have been achieved by providing a method for improving the maintenance of light emission which is obtainable from an electroluminescent device which incorporates electroluminescent phosphor processed in accordance with the present method.

While a best specific example has been described in detail, it is to be particularly understood that the invention is not limited thereto or thereby.

I claim as my invention:

1. The method of improving the maintenance of light emission obtainable from an electroluminescent device incorporating electroluminescent phosphor having a matrix at least principally comprising zinc sulfide and including copper as activator, which phosphor has initially been prepared by firing the phosphor raw-mix constituents in a sulfurizing atmosphere at a predetermined temperature for a predetermined period of time, which method comprises: after initial preparation but before the phosphor is incorporated into an electroluminescent device, baking the phosphor in an atmosphere of ammonia or sulfur dioxide at a temperature of from 450° C. to 700° C. for a period of at least about one hour.

2. The method as specified in claim 1, wherein after said phosphor is baked, said phosphor is cooled and then washed in a material which is a good solvent for cuprous sulfide but which is not a good solvent for zinc sulfide.

3. The method as specified in claim 1, wherein after initial preparation but prior to baking, said phosphor is washed in a material which is a good solvent for cuprous sulfide but which is not a good solvent for zinc sulfide, thereafter there is evenly distributed in said washed phosphor from 0.001% to 1% by weight of copper in compound form, and thereafter said phosphor is baked in said sulfur dioxide or ammonia atmosphere.

4. The method as specified in claim 3, wherein said washing material is a sodium cyanide solution.

5. The method as specified in claim 3, wherein said baking atmosphere is ammonia.

6. The method as specified in claim 3, wherein said baking atmosphere is sulfur dioxide.

7. The method as specified in claim 3, wherein said copper in compound form is copper acetate.

8. The method as specified in claim 4, wherein said copper acetate is distributed throughout said phosphor in an amount of about 0.01% by weight of said phosphor.

References Cited by the Examiner

UNITED STATES PATENTS

| 2,950,257 | 8/1960 | Froelich | 252—301.6 |
| 2,982,740 | 5/1961 | Goldberg et al. | 252—301.6 |
| 3,080,325 | 3/1963 | Aven et al. | 252—301.6 |
| 3,082,344 | 3/1963 | Thornton | 252—301.6 |

FOREIGN PATENTS 606,136  10/1960  Canada.

HELEN M. McCARTHY, *Acting Primary Examiner.*
TOBIAS E. LEVOW, *Examiner.*
R. D. EDMONDS, *Assistant Examiner.*